(No Model.)
H. W. LAWRENCE.
THILL COUPLING.
No. 511,302.     Patented Dec. 19, 1893.
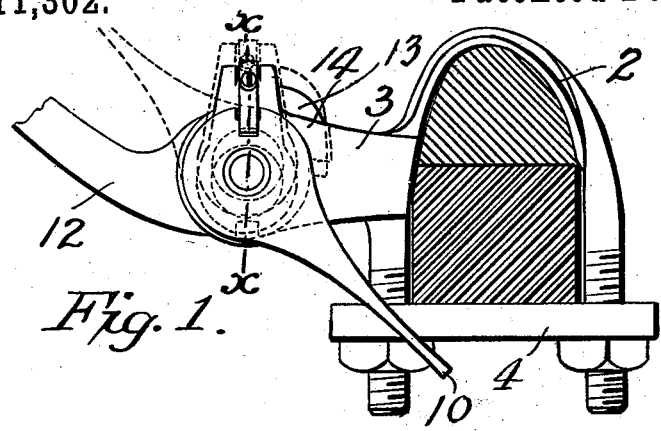
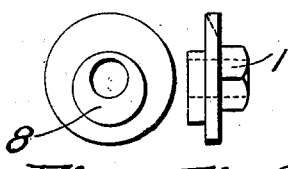
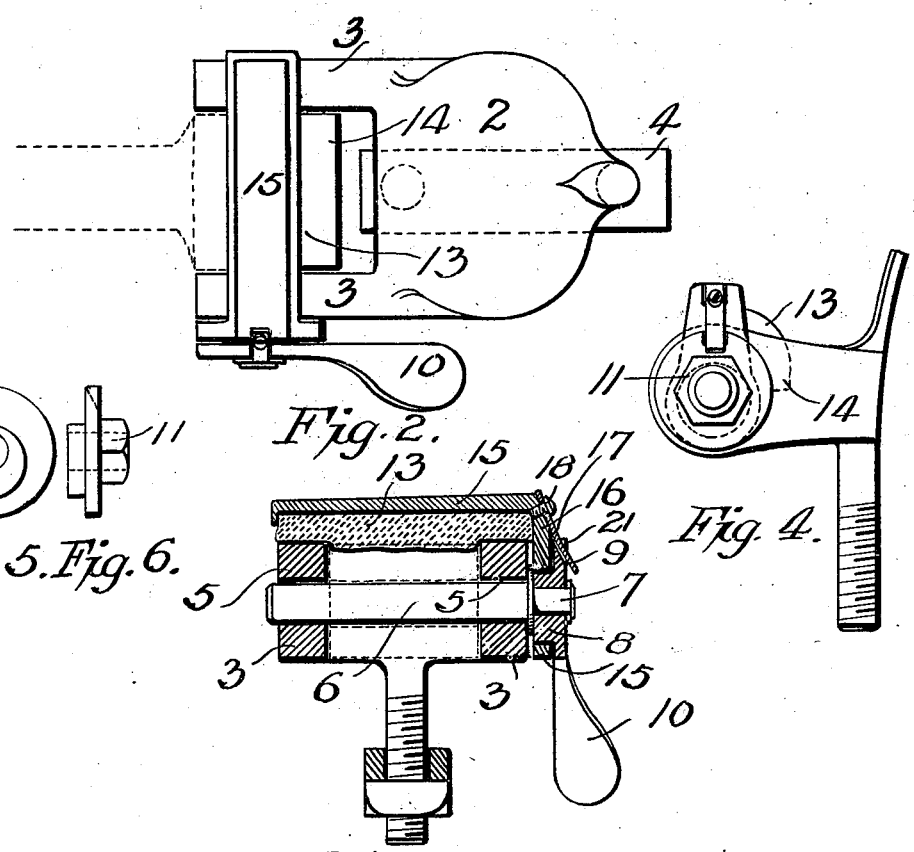
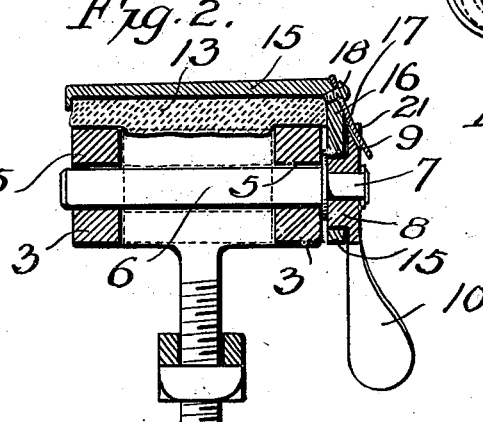
Witnesses.
Chas. E. Van Dorn
F. S. Lyon
Inventor
Herbert W. Lawrence.
By Paul & Hawley
his Attorneys.

UNITED STATES PATENT OFFICE.

HERBERT W. LAWRENCE, OF MONTEVIDEO, MINNESOTA.

THILL-COUPLING.

SPECIFICATION forming part of Letters Patent No. 511,302, dated December 19, 1893.

Application filed April 1, 1893. Serial No. 468,642. (No model.)

*To all whom it may concern:*

Be it known that I, HERBERT W. LAWRENCE, of Montevideo, Chippewa county, State of Minnesota, have invented certain Improvements in Thill-Couplings and Antirattlers, of which the following is a specification.

My invention relates to thill couplings, and particularly to means for connecting the eye with the shackle, and further to means for preventing noise made by the rattling together of the parts.

My object is to provide a readily detachable coupling-pin, to dispense with screw threads and nuts, and to provide a combination antirattler and shackle bolt holder, all of which may be detached and the bolt withdrawn to liberate the thill eye or shank at a moment's notice.

My invention consists in the combination with the shackle and the eye of the bolt or short shaft extending through said parts, a revoluble cam journaled upon the end of the bolt, a strap for said cam, and having an upper end or arm extending across the shackle and the eye, and a flexible block or spring device arranged between the said arm and the first mentioned parts, whereby as said cam is turned said arm is drawn inwardly to press said flexible part firmly upon the eye and upon the shackle lugs, all as hereinafter described and particularly pointed out in the claims.

My invention will be more readily understood by reference to the accompanying drawings forming a part of this specification, in which—

Figure 1 is a side elevation of a thill coupling embodying my invention. Fig. 2 is a plan view thereof, the thill shank or eye being removed. Fig. 3 is a sectional view on the line $x$—$x$ of Fig. 1. Fig. 4 is a side view similar to Fig. 1, but showing a somewhat different construction of the cam device. Figs. 5 and 6 are respectively side and edge views of the cam nut shown in Fig. 4.

As shown in the drawings, the shackle, composed of the clip 2 and the separated lugs 3, is of the usual construction, and the usual cross plate 4 is provided for securing the same upon the axle. The shackle lugs 3 are provided with the holes 5 to receive the short bolt or shaft 6, the end 7 of which is preferably reduced in size somewhat and is adapted to receive the cam 8, which cam is provided with a circular and flaring edge 9, in connection with which I may provide any desirable means for turning the cam. For this purpose I have shown the short handle 10 (see Figs. 1, 2 and 3) by which the cam may be turned, or in place thereof I may simply provide the cam with the polygonal head 11 to which a wrench may be applied. The thill shank or eye 12 is held between the lugs 3 and upon the short shaft 6, and for preventing the same from rattling, and also to prevent the shaft or bolt 6 from falling out, I provide the flexible rubber block 13, or a spring, which block is of sufficient length to extend across both the lugs 3 and the eye 12. The block is provided with a downwardly projecting part or lip 14 adapted to prevent the block from slipping lengthwise. The block is held in place and pressed firmly down upon the parts by the arm 15 extending parallel with the bolt 6, and having a recess to receive the rubber block 13. This arm projects from the strap 16 extending about the cam 8 and held upright by the flaring edge of the cam. As said cam is rotated, therefore the arm will be raised or lowered to loosen the block 13 or to tighten the same upon the shackle and the eye. When the cam is thrown down the pressure of the ends of the block upon the lugs, and the engagement of the depressed portion of the block with the inner sides of the lugs 3, effectually prevents the arm from slipping, and consequently preventing the withdrawl of the bolt. When the cam is raised, as shown by dotted lines in Fig. 1, the block will be loosened and the bolt, with all parts attached thereto, may be readily drawn out to liberate the eye and allow the removal of the shaft or the tongue as the case may be. To lock the cam against movement after being set, I preferably provide the spring 17 secured upon the strap and arm, as shown at 18, and adapted to drop into the notch 21 provided in the flange of the cam. It will be noted that the cam is not secured upon the shaft or bolt, which may therefore move with the eye without, loosening any of the other parts of my device.

It is obvious that I may modify the construction shown and described without departing from the spirit of my invention, and I therefore do not confine myself to the exact construction shown and described.

Having thus described my invention, I claim as new and desire to secure by Letters Patent—

1. The combination with the shackle, the eye and the bolt, of a cam arranged to revolve with respect thereto, a strap embracing said cam and having an arm, and a flexible piece arranged beneath said arm to be pressed upon said eye when said cam is turned, substantially as described.

2. The combination with the shackle, the eye and the bolt, of a cam arranged to revolve with respect thereto, a strap embracing said cam and having an arm, and a flexible piece arranged beneath said arm to be pressed upon said eye when said cam is turned, and means for locking said cam, substantially as described.

3. The combination with the shackle, the eye and the bolt, of a cam journaled upon the end of said bolt, means for turning said cam, a strap embracing said cam, and a flexible piece connected with said strap, and, when said cam is turned down, adapted to engage and press upon both said eye and the lugs of the shackle, substantially as described.

4. The combination with the shackle, the eye and the bolt, of a cam journaled upon the end of said bolt, means for turning said cam, a strap embracing said cam, a flexible piece connected with said strap, and, when said cam is turned down, adapted to engage and press upon both said eye and the lugs of the shackle, and said flexible piece having a lip or projection 14 extending between the lugs of the shackle, substantially as described.

5. The combination with the shackle, the eye and the bolt, of a cam journaled upon said bolt and having a flaring edge, means attached to said cam whereby it may be turned, a strap embracing said cam and provided with an arm, a spring for locking the cam, and the flexible rubber block 13 secured upon said arm and having the projection 14 extending between the lugs of the shackle, substantially as and for the purpose specified.

In testimony whereof I have hereunto set my hand this 28th day of March, 1893.

HERBERT W. LAWRENCE.

In presence of—
C. G. HAWLEY,
BESSIE BOOTH.